United States Patent

[11] 3,564,165

| | | |
|---|---|---|
| [72] | Inventor | Henry C. Doennecke<br>Tulsa, Okla. |
| [21] | Appl. No. | 721,498 |
| [22] | Filed | Apr. 15, 1968 |
| [45] | Patented | Feb. 16, 1971 |
| [73] | Assignee | Unit Rig & Equipment Company<br>Tulsa, Okla. |

[54] TROLLEY ENTRY PAN
2 Claims, 3 Drawing Figs.

[52] U.S. Cl. ................................................. 191/35
[51] Int. Cl. ................................................. B60m 1/12
[50] Field of Search ........................................ 191/35;
104/262

[56] References Cited
UNITED STATES PATENTS

| | | | |
|---|---|---|---|
| 2,376,758 | 5/1945 | Dahl ............................ | 191/45 |
| 1,195,916 | 8/1916 | Dauben et al ................. | 191/35 |
| 1,416,536 | 5/1922 | Whaley ........................ | 191/35 |
| 3,152,673 | 10/1964 | Duffy .......................... | 191/35 |

*Primary Examiner*—Arthur L. LaPoint
*Assistant Examiner*—George H. Libman
*Attorney*—William S. Dorman ABSTRACT: A trolley entry pan for automatically guiding the trolley poles of an electric powered vehicle, and particularly an electric powered rubber tired off-highway vehicle, into proper alignment with the trolley wires from which the vehicle receives electric power. The entry pan comprises a pair of substantially funnel-shaped channel members disposed in side-by-side relation for receiving a trolley pole in the open larger end of each channel and guiding the respective pole directly onto or into engagement with the respective trolley wire. The trolley poles are brought into engagement with the entry pan device as the vehicle moves in a direction toward the trolley wires. Thus, the pan automatically positions the trolley poles on the respective trolley wire in a manner eliminating manual handling of the poles at the initial stage of the engagement with the trolley wire.

PATENTED FEB 16 1971 3,564,165

INVENTOR:
HENRY C. DOENNECKE

BY William S. Dorman

ATTORNEY

TROLLEY ENTRY PAN

This invention relates to improvements in electric powered vehicles and more particularly, but not by way of limitation, to a trolley entry pan for automatically guiding the trolley poles of an electric powered rubber tired off-highway vehicle into the initial engagement with the troller wires from which the vehicle receives electric power.

Electric powered rubber tired off-highway vehicles are widely used in mining operations, and the like, and are normally provided with a pair of outwardly extending trolley poles which engage a pair of oppositely charged trolley lines or wires in order to provide the electric power for the operation of the vehicle. The vehicles are usually provided with an auxiliary diesel motor for providing driving power therefor when the trolley poles are not engaged with the trolley wires. The auxiliary power unit is utilized for operation of the vehicle for moving thereof toward the ends of the trolley wires for the initial engagement of the poles therewith. These vehicles are of a very large size which makes the maneuverability thereof somewhat cumbersome and it is difficult to align the two trolley poles with the ends of the two trolley wires without the necessity of manual handling of the poles. As a result devices have been developed for facilitating the engagement of the trolley poles with the wires, such as that shown in the U.S. Pat. No. 3,152,673 to W. R. Duffy, issued Oct. 13, 1964, and entitled "Trolley Pole Guide". However, as a practical matter it has been found almost as difficult to align the trolley poles with the Duffy device as with the trolley lines themselves.

The present invention contemplates a novel trolley entry pan particularly designed and constructed for facilitating the guiding of the trolley poles onto the respective trolley lines or wires. The entry pan comprises a pair of substantially funnel shaped elongated channels having the larger or flared ends thereof extending longitudinally in a direction away from the trolley lines to be engaged. The smaller or tapering end of each channel is adapted for receiving a portion of the respective trolley wire therethrough and holding the wire portion in a preselected position therein. As the vehicle moves in a direction toward the trolley wires, the trolley poles are each initially engaged by the open flared end of the respective channel, and the channels guide the poles into the smaller or tapered channel portion where the poles are automatically brought into engagement with the wire positioned therein. Continued movement of the vehicle in the direction of the wires will move the engaged poles out the open end of the smaller channel portions and along the trolley wires. The vehicle poles will then be properly engaged with the trolley wires for receiving the electric power therefrom and directing the power to the vehicle for operation thereof.

The trolley entry pan of the invention is of a configuration for substantially universal installation. The device may be positioned in an overhead installation whereby trolley poles extending upwardly from the vehicle may be efficiently and quickly engaged with the trolley wires. Alternately, the device may be positioned at a side-type installation whereby trolley poles extending substantially horizontally from the vehicle or at an angle with respect to the vertical may be similarly engaged with the trolley wires.

It is an important object of this invention to provide a novel trolley entry pan for facilitating the engagement of trolley poles with the end of the respective trolley wires.

It is another object of this invention to provide a novel trolley entry pan for automatically guiding trolley poles into engagement with trolley wires and which may be universally mounted for use with substantially any type of trolley poles.

Another object of this invention is to provide a novel trolley entry pan particularly designed and constructed for use in combination with the trolley poles and trolley wire utilized in the operation of electric powered rubber tired off-highway vehicles.

A further object of this invention is to provide a novel trolley entry pan which is simple and efficient in operation and economical and durable in construction.

Other and further objects and advantageous features of the present invention will hereinafter more fully appear in connection with a detailed description of the drawings in which.

Figure 1:
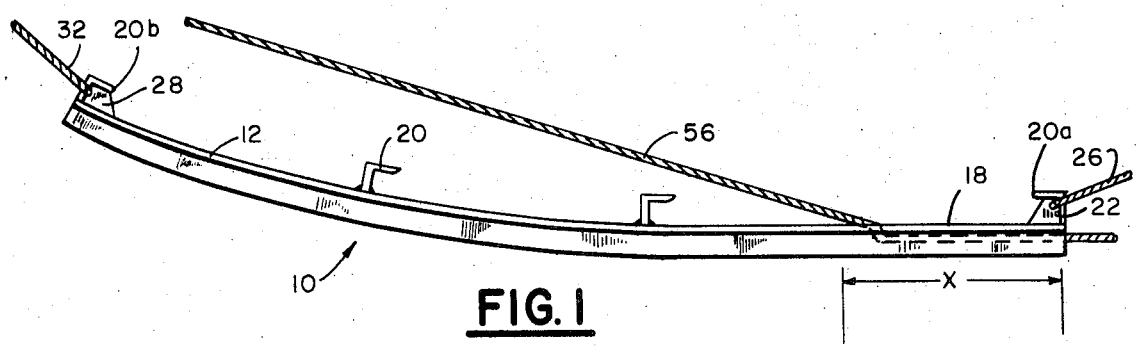
FIG. 1 is a side elevational view of a trolley entry pan embodying the invention.
Figure 2:
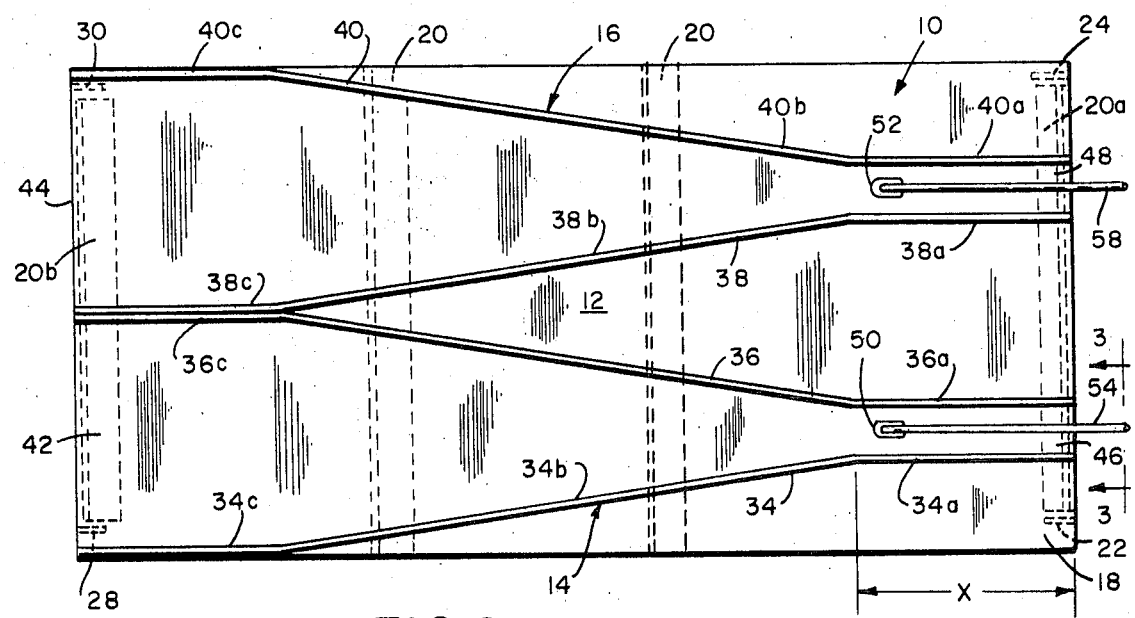
FIG. 2 is a bottom view of a trolley entry pan embodying the invention.

Referring to the drawings in detail, reference character 10 generally indicates a trolley entry pan comprising a top plate 12 having a pair of substantially identical channel members 14 and 16 disposed thereon and extending in side-by-side relation as particularly shown in FIG. 2. The top plate 12 may be constructed from any suitable material, such as sheet metal, or the like, but not limited thereto, and is preferably provided with a substantially straight or flat portion 18 at the right hand side or end thereof as viewed in FIGS. 1 and 2, and extending throughout a relatively small portion of the overall length thereof, as indicated at X. The remaining portion of the top plate 12 extends angularly upward, as viewed in FIG. 1, and it is preferably to provide a relatively large radius at each direction change in the upward bending of the plate, thus precluding any sharp angles in the surface of the plate 12.

A plurality of longitudinally spaced transversely extending reinforcing ribs or stiffing members 20 are welded or otherwise secured to the upper or outer surface of the plate 12 to provide a rigidity for the structure 10. One of the reinforcing ribs 20A is preferably disposed in the proximity of the right hand end of the plate 12, as viewed in FIGS. 1 and 2, and is of a length slightly less than the width of the plate 12. A pair of spaced upwardly extending brackets 22 and 24 may be welded or otherwise rigidly secured to the outer surface of the plate 12 in the proximity of the opposite ends of the rib 20A and are each apertured for receiving one end of suitable support ropes or cables 26 (only one of which is shown in FIG. 1 of the drawings). Another of the reinforcing ribs 20A is preferably disposed in the proximity of the left hand end of the plate 12, as viewed in FIGS. 1 and 2, and is similarly of a length slightly less than the width of the plate 12. A pair of spaced upwardly extending brackets 28 and 30, similar to the brackets 22 and 24, are secured to the upper surface of the plate 12. Each of the brackets 28 and 30 is apertured for receiving one end of suitable support ropes or cables 32 (only one of which is shown in FIG. 1). The ropes 26 and 30 are anchored between the respective brackets and a suitable support structure (not shown) for supporting the device 10 in the desired location for a purpose as will be hereinafter set forth.

The channel 14 comprises a pair of substantially identical oppositely disposed outwardly extending flange members 34 and 36 welded or otherwise secured to the lower or inner surface of the plate 12 opposite from the ribs 20. The flange 34 comprises a first substantially straight portion 34a at the right hand end thereof as viewed in the drawings and which is preferably of a length substantially corresponding to the dimension X. The central portion 34b is angularly disposed with respect to the portion 34a and extends outwardly therefrom to terminate in a second substantially straight portion 34c at the left hand end of the flange 34. The flange 36 is substantially a mirror image of the flange 34 and comprises a first substantially straight portion 36a similar to the portion 34a and spaced therefrom, as particularly shown in FIGS. 2 and 3. The central portion 36b is angularly disposed with respect to the portion 36a and extends in a direction away from the central portion 34b to provide a substantially flared or funnel-shaped configuration for the channel 14. The central portion 36b terminates in a second substantially straight portion 36c corresponding to the portion 34c and spaced therefrom a greater distance than the distance between the first straight portions 34a and 36a for a purpose as will be hereinafter set forth.

The channel 16 is substantially identical with the channel 14 and is secured to the lower or inner surface of the plate 12 in substantially parallel relationship with respect thereto. The channel 16 comprises a pair of spaced outwardly extending flanges oppositely disposed 38 and 40 which are welded or otherwise secured to the inner surface of the plate 12 opposite from the ribs 20. The flange 38 comprises a first substantially straight portion 38a at the right hand end thereof corresponding to or similar to the straight portion 34a. The central portion 38b is angularly disposed with respect to the portion 38a similar to and corresponding with the central portion 34b and extends outwardly from the portion 38a to terminate in a second substantially straight portion 38c at the left hand end of the flange 38, which corresponds to the portion 34c. The flange 40 is substantially a mirror image of the flange 38 and comprises a first substantially straight portion 40a similar to the straight portion 36a and spaced from the straight portion 38a. The central portion 40b is angularly disposed with respect to the portion 40a and extends in direction away from the central portion 38a to provide a substantially flared or funnel-shaped configuration for the channel 16 similar to the channel 14. The central portion 40b terminates in a second substantially straight portion 40c corresponding to the portion 36c and spaced from the portion 38c a greater distance than the distance between the straight portions 38a and 40a for a purpose as will be hereinafter set forth.

It will be apparent from an inspection of FIG. 2 that the larger ends 42 and 44 of the channels 14 and 16, respectively, are open for receiving trolley poles (not shown) therein. Similarly, the smaller ends 46 and 48 of the channels 14 and 16, respectively, are open for permitting passage of the trolley poles (not shown) therefrom, as will be hereinafter set forth in detail.

A first aperture 50 is provided in the plate 12 and is preferably interposed between the portions 34a and 36a in the flat portion 18 of the plate 12. A second aperture 52 is provided in the plate 12 and is preferably interposed between the portions 38a and 40a in the flat portion 18 of the plate 12. A cradle member 54 (FIG. 3) is welded or otherwise secured to the inner or lower surface of the plate 12 and interposed between portions 34a and 36a. The cradle 54 is preferably of an arcuate cross-sectional configuration and may be centrally disposed between the portions 34a and 36a and extends substantially throughout the length of the flat portion 18 of the plate 12 for a purpose as will be hereinafter set forth. A similar cradle (not shown) is disposed between the portions 38a and 40a.

Figure 3:
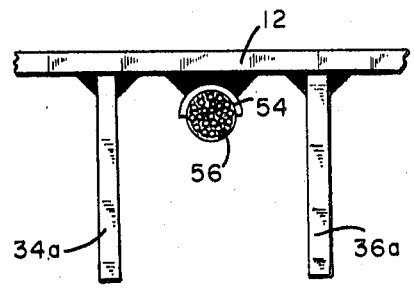
FIG. 3 is an elevational view taken on line 3–3 of FIG. 1.

One trolley wire 56 is inserted through the aperture 50 and disposed within the cradle 54, as particularly shown in FIG. 3, and extends outwardly through the open end 46 of the channel 14. A second trolley wire 58 is inserted through the apertures 52 and is similarly disposed within the cradle (not shown) secured between the portions 38a and 40a, and extends outwardly through the open end 48 of the channel 16. It is preferably that the device 10 be disposed in the proximity of the end of the pair of trolley wires, or the beginning of the trolley lines, and it is also preferably that suitable insulating means be interposed in each of the lines 56 and 58 at a position slightly spaced from the device 10 for insulating the device 10 from the wires as is well known.

In order to engage the trolley poles (not shown) of a vehicle (not shown), and particularly of an electric powered rubber tired off-highway vehicle, the vehicle is driven under the power of the usual auxiliary diesel engine (not shown) in the usual manner in a direction toward the trolley entry pan 10. As the vehicle nears the open ends 42 and 44 of the channels 14 and 16, respectively, it is preferably that the direction of travel of the vehicle be in substantial alignment with the direction of trolley wires 56 and 58.

In a vehicle wherein the trolley poles thereof extend in an upward direction, it is preferable that the trolley entry pan be secured in an overhead position substantially as shown in the drawings with the lower or inner surface of the plate 12 being disposed in a direction toward the surface of the ground therebelow. As the vehicle moves in a direction toward the longitudinal direction of the wires 56 and 58, the trolley poles are initially engaged by the elevated open ends 42 and 44 of the channels 14 and 16. The poles engage the inner or lower surface of the plate 12 in the channels 14 and 16, and continued movement of the vehicle in the direction toward the wires 56 and 58 the poles are gently urged in a downward direction, and guided by the flanges 34 and 36, and 38 and 40 into the smaller channel portions between the portions 34a and 36a, and 38a and 40a. As the poles enter the smaller channel portions, the poles will be automatically brought into engagement with the trolley wires 56 and 58 extending through these small channel portions. The poles will move along the length of the wire portions disposed in the cradle members and this is sufficient length to assure an efficient engagement between the trolley wires and the respective trolley poles. Continued movement of the vehicle will move the poles out through the open ends 46 and 48 of the channels 14 and 16, and the poles will then be in engagement with the trolley wires wherein the continued operation of the vehicle will be powered from the electric current supplied thereto from the trolley wires, as is well known.

In a vehicle wherein the trolley poles extend in a substantially horizontal or sideways direction therefrom, the trolley entry pan 10 may be disposed at substantially right angles with respect to the horizontal wherein the inner surface of the plate 12 will be disposed in a direction toward the approaching vehicle. In this type of installation the trolley poles will enter the open ends 42 and 44 of the channels 14 and 16 in the same manner as hereinbefore set forth, and will be guided into connection with the respective trolley wires 56 and 58 by the continued movement of the vehicle in the longitudinal direction of the wires and pan 10. Of course, the poles will move out of the device 10 through the open ends 46 and 48 of the channels 14 and 16, respectively, and will be efficiently engaged with the trolley wires.

From the foregoing it will be apparent that the present invention provides a novel trolley entry pan wherein the trolley poles of an electric powered vehicle, and particularly a rubber tired off-highway vehicle, may be automatically engaged with the trolley wires without the necessity of manual handling of the poles or wires. The vehicle may be driven in a direction substantially corresponding to the longitudinal direction of the lines, and the poles will be automatically be moved into engagement with the flared open ends of the trolley entry pan. The guide channels efficiently guide the poles into the smaller or reduced channel portions wherein the poles are efficiently engaged with a trolley wire portion positioned therein. The poles move out of the open smaller ends of the device in an engaged position on the respective trolley wires.

Whereas the present invention has been described in particular relation to the drawings attached hereto, it should be understood that other modifications apart from those shown of suggested herein, may be made within the spirit and scope of this invention.

I claim:

1. A trolley pan for guiding a pair of trolley poles into initial engagement with a pair of trolley wires and comprising a support plate member suspended in the proximity of the beginning of the trolley wires, said plate member having an arcuate angular portion for initially engaging the trolley poles and urging the trolley poles in a direction conforming to the said angular configuration said arcuate angular portion terminating in substantially straight portion, a pair of independent channel members carried by the support plate, each of said channel members having a flared portion for initially receiving one of said trolley poles simultaneously in each of said channel members, each of said channel members having a central substantially funnel shaped portion for guiding the respective trolley pole through the channel, each of said channel members having a relatively small releasing portion disposed in substantial alignment with the flat portion of the plate member for receiving the trolley poles from the respective funnel shaped portion, each of said relatively small releasing portions being provided with aperture means for receiving a portion of a respective trolley wire therein and insulating the wire therefrom, each of said relatively small releasing portions being provided with an open end whereby the respective trolley wire may extend therebeyond, each of said trolley poles being positively guided into engagement with the trolley wire portion disposed in the respective channel member, and each of said trolley poles being released from the said relatively small releasing portion in engagement with the respective trolley wire.

2. A trolley entry pan for guiding a pair of trolley poles into initial engagement with a pair of trolley wires and comprising a support plate suspended in a proximity of the beginning point of the trolley wires, a pair of channel members carried by the plate and extending outwardly therefrom, each of said channel members having the opposite ends thereof open for receiving one trolley pole in each channel and releasing said trolley pole therefrom upon longitudinal movement of the trolley poles with respect thereto, aperture means provided in said plate for directing a portion of each of said trolley wires into a portion of a respective channel member and insulating said wires therefrom, means provided for each channel member for guiding the respective trolley pole into a positive engagement with the respective trolley wire upon movement of the trolley pole through the respective channel member to provide said initial engagement of the trolley poles with the trolley wires, said plate member being provided with an arcuate angularly disposed portion for initial engagement with the trolley poles, and the plate member being provided with a substantially flat portion conterminous with the angular portion for receiving the trolley wire portions therein, said arcuate angular portion being provided for guiding the trolley poles in an angular direction within the respective channel and into the flat portion thereof for engagement with the trolley wires therein.